United States Patent Office 3,185,745
Patented May 25, 1965

3,185,745
OLEFIN DIMERIZATION
Kenneth L. Lindsay, Baton Rouge, La., assignor to Ethyl Corporation, New York, N.Y., a corporation of Virginia
No Drawing. Filed Aug. 30, 1961, Ser. No. 134,839
7 Claims. (Cl. 260—683.15)

The present invention is concerned with the dimerization of olefins, especially the dimerization of propylene to produce 4-methylpentene-1.

Many techniques have been employed for dimerizing olefinic materials to produce different olefins. The alkali metals have been particularly effective as catalysts for dimerization at various conditions of temperature and pressure. The alkali metal catalyzed procedures have been especially described with regard to the dimerization of propylene to produce 4-methylpentene-1, a product which is quite useful in enhancing the octane properties of a hydrocarbon fuel or for polymerization to result in a high melting polymer useful in fibers, films, etc. By way of example, the dimerization of propylene employing the alkali metal, potassium, as a catalyst is described in recently issued U.S. Patent 2,986,588 (see also Belgian Patent 588,134). As indicated therein, the dimerization does occur for producing hexene products, especially 4-methylpentene-1 as a major component. Inherent in this technique, however, is the fact that the reaction rate is slow and that a considerable amount of isomerization occurs to produce other less desirable isomers. Still further, it is well recognized that sodium metal, the most economical of all the alkali metals, is not employable because of the fact that primarily isomerization occurs resulting in a small proportion of 4-methylpentene-1 in the product mixture. Further, the conversions and catalyst utilization leave something to be desired. Others have indicated procedures for the dimerization of olefins wherein promoters, namely the polynuclear aromatic hydrocarbons, for the alkali metal catalysts are suggested (note Freed U.S. 2,492,693). Still others have employed the use of special supports for the alkali metal such as carbon (U.S. Patent 2,881,234) and in this instance, the proportion of 4-methylpentene-1 obtained in the dimerization product has been shown to be essentially negligible. Still others have employed the use of aminated alkali metal on supports such as alumina for dimerization of olefins such as propylene and here also the proportion of 4-methylpentene-1 obtained in the $C_6$ fraction is indicated to be essentially negligible (Union of South Africa Patent 60/4511).

Because of these inherent deficiencies in the prior art procedures, the alkali metal dimerization technique has not been employed on a commercial scale. It is, however, quite desirable to effect the dimerization of olefins, especially propylene, in a more efficient and practical manner in order that these materials can be made economically available for their many diverse uses.

Accordingly, an object of this invention is to provide a new and novel process for the dimerization of olefins. A particular object is to provide a process whereby olefins are dimerized at a faster rate more selectively and at greater conversions with a minimization of isomerization of the resulting product to a less desirable olefin. Still further objects are to overcome the above and other deficiencies of the prior art procedures of alkali metal dimerization. A specific object is to provide a more effective, selective, and improved method for dimerizing propylene than known heretofore. Other objects will be evident as the discussion proceeds.

The above and other objects of this invention are accomplished by heating an olefin in the presence of a catalyst comprising an alkali metal and an oxide of a metal selected from the group consisting of alkali metals having an atomic number of 19 to 55, inclusive, and barium. The olefins are generally straight chain having from 3 up to and including about 8 carbon atoms with propylene being especially preferred. Of the alkali metals, potassium is particularly preferred and employed in conjunction with an oxide of potassium. It has been found that the oxide activates and promotes the dimerization reaction more selectively, e.g., in the case of propylene to 4-methylpentene-1. The temperature which is employed is preferably of the order of 150 to 200° C. with pressures being between 300 to 1500 p.s.i. Likewise, the proportion of the oxide promoter employed is preferably between about 10 to 30 percent by weight of the total weight of the alkali metal and the oxide employed as the catalyst system. By way of example of an especially preferred embodiment of this invention, propylene is heated in the presence of a minor amount of about 2.5 percent by weight, based on the total weight of catalyst and propylene, of a catalyst consisting of a mixture of potassium and potassium oxide in a ratio of 5 parts of the former to 1 part by weight of the latter at 150 to 200° C. and 300 to 1500 p.s.i. to produce 4-methylpentene-1.

The process of the present invention has many unique advantages over the prior art procedures for dimerizing olefins. By way of example, a faster rate of dimerization is accomplished by virtue of incorporation of the designated oxides in the catalyst system. It has been found that higher yields and conversions are obtained in shorter periods of time for producing the desired olefin. Indeed, not only does the system promote the dimerization to a greater extent than those systems previously known, but it also minimizes the undesirable effect of isomerization of the double bond, that is, moving the double bond from one position to another. More spectacular is the advantage that even the most economical sodium metal can be employed as the alkali metal to produce the desired olefin product in high yield, conversion, and rate of reaction. A still further advantage attributable to the instant catalyst system is that the stringent requirements of an essentially anhydrous system need not be employed. Thus, one need not employ rigidly anhydrous reagents and conditions according to the present invention. A still further advantage is that a greater catalyst utilization is possible than experienced in the prior art procedures. The conversion of olefins, such as propylene, to the dimer product is greater per unit weight of catalyst than when using the prior art methods, for example, potassium metal alone. These and other advantages will be evident as the discussion proceeds.

The alkali metals which are employed in the catalyst include those metals of Group I–A of the Periodic Chart of the Elements, e.g., lithium, sodium, potassium, rubidium, and cesium. The metal can be in any form as, for example, lumps, bars, ribbon, or the like, since in most instances it becomes molten under the reaction conditions. Of the alkali metals, sodium and potassium are particularly preferred because of greater economy and their greater effectiveness.

The oxide employed as an essential constituent of the catalyst system is an oxide of an alkali metal having an atomic number of 19 to 55, inclusive, or of the metal barium. Thus, the oxides include the oxides of potassium, rubidium, cesium, or barium (including the peroxides and superoxides). It has been found that these oxides in conjunction with the above described alkali metals produce profound effects in the dimerization reactions. The oxides are employed in their readily available solid commercial forms, for example, as flakes, pellets, powder, and the like. In order to effect better distribution and admixture of the oxide with the alkali metal, reduction in particle size is generally desirable. Thus, the oxide is preferably employed in a form in which it has an average particle size of 100 microns or less with the largest particle size being less than 500 microns in major dimension. Pulverized oxide or oxide in powdered form is particularly effective. An oxide of potassium comprises an especially preferred embodiment. It in conjunction with sodium or potassium metal, especially the latter, has been found to be even more effective than the other alkali metal-alkali metal oxide combinations.

In general, any olefin can be dimerized according to the processing of the instant invention, especially those having from 3 up to about 8 carbon atoms. It is preferable that the olefin be a straight chain olefin, especially the alpha-olefins, since such are more readily dimerized to desirable products. Thus, among the olefins which are employed are included propylene, butene-1, butene-2, isobutylene, hexene-1, and octene-1. Propylene comprises an especially preferred embodiment because of its ready availability and the unique benefits obtained when employing such in conjunction with the catalysts of this invention toward the production of 4-methylpentene-1.

The operational techniques are quite simple and varied. By way of example, all that one need do is add the alkali metal and the alkali metal oxide to a reactor, supported or unsupported, and pressurize the reactor with the olefin e.g. propylene. If desired, a solvent or reaction diluent can then be added to the system. The system is then heated to the desired reaction temperature and maintained at these conditions, usually with agitation, until the reaction is essentially complete as indicated by the pressure drop. The reactor can then be vented to recover the olefin products and recycle any unreacted olefin, if such be the case. Then, the reactor need only be pressurized with the olefin and the cycle repeated numerous times without changing the catalyst. Alternatively, rather than employ the aforementioned batch or semi-continuous procedure, continuous procedures can be employed whereby the pressure is maintained by the continuous feeding of the olefin to the reactor with continuous withdraw of the dimerized product therefrom for subsequent separation of the product and recycle of the unreacted starting olefin. Other variations of batch, semi-continuous, or continuous operation will now be evident.

The present invention will be more readily understood from the following examples.

EXAMPLE I

To a reactor equipped with internal agitation, external heating means, and a means for adding and discharging the reactants and products was added 5 grams of potassium metal and 5.7 grams of potassium superoxide. Then, 100 ml. of Nujol, a high boiling saturated aliphatic hydrocarbon mixture of the mineral oil boiling range, was added to the reactor and heat applied to raise the temperature to about 140° C. Agitation was commenced and the reactor pressurized with 1.23 moles of propylene and heated to 190° C. and a pressure of to 1050 p.s.i.g. When the pressure had dropped to about 400 p.s.i.g., the reactor was vented and the product olefins analyzed. Then, the reactor was repressurized with propylene without the addition of further catalyst to repeat the cycle. Employing this technique, the following table illustrates the results obtained upon recharging with propylene at the end of each cycle.

Table I

| Temp., °C. | Residence time (hrs.) | Moles propylene fed | Moles $C_6$ product | Moles $C_6$ produced per hr./liter of Reactor | Composition of $C_6$ product (wt. percent) | | | | |
|---|---|---|---|---|---|---|---|---|---|
| | | | | | $M_4P_1$ | $M_4P_2$ | $M_2P_1$ + $H_1$ | $M_2P_2$ + $Tr-H_2$ | Cis $H_2$ |
| 185-190 | 2.33 | 1.23 | 0.1639 | 0.2809 | 78.97 | 11.13 | 6.39 | 2.51 | 0.99 |
| 184-189 | 1.0 | 1.23 | 0.2267 | 0.9067 | 76.75 | 12.99 | 5.98 | 3.03 | 1.10 |
| 186-190 | 1.217 | 1.23 | 0.2269 | 0.7458 | 69.37 | 19.77 | 4.46 | 4.56 | 1.45 |
| 186-188 | 0.766 | 1.23 | 0.1115 | 0.5818 | 73.58 | 14.93 | 5.87 | 1.85 | 1.38 |

$M_4P_1$ = 4-methylpentene-1
$M_4P_2$ = 4-methylpentene-2
$M_2P_1$ = 2-methylpentene-1
$H_1$ = hexene-1
$M_2P_2$ = 2-methylpentene-2
$Tr-H_2$ = trans-hexene-2
$CisH_2$ = cis-hexene-2

EXAMPLE II

This run was conducted essentially the same as Example I with exception that a mixture of $K_2O$ and $K_2O_2$ was employed in place of the potassium superoxide and the $K_2O-K_2O_2$ was prepared insitu by merely bubbling a limited amount (insufficient to oxidize all of the potassium to $K_2O$) of oxygen through the potassium-solvent mixture while stirring at 160° C. prior to the initial pressurization with propylene. The results obtained are indicated in the following table.

Table II

| Temp., °C. | Residence time (hrs.) | Moles propylene fed | Moles $C_6$ product | Moles $C_6$ produced per hr./liter of reactor | Composition of $C_6$ product (wt. percent) | | | | |
|---|---|---|---|---|---|---|---|---|---|
| | | | | | $M_4P_1$ | $M_4P_2$ | $M_2P_1$ + $H_1$ | $M_2P_2$ + $Tr-H_2$ | Cis $H_2$ |
| 185-187 | 1.33 | 1.23 | 0.1574 | 0.4734 | 79.88 | 10.38 | 6.15 | 2.45 | 1.03 |
| 180-188 | 0.483 | 1.23 | 0.1663 | 1.3772 | 77.58 | 12.68 | 6.08 | 2.36 | 1.19 |
| 186-187 | 0.483 | 1.23 | 0.1900 | 1.5735 | 71.56 | 18.00 | 4.69 | 3.52 | 1.35 |
| 186-187 | 0.367 | 1.23 | 0.1848 | 2.0160 | 66.05 | 23.05 | 3.85 | 4.13 | 1.41 |
| 187 | 0.317 | 1.23 | 0.1572 | 1.9836 | 64.57 | 23.89 | 3.98 | 4.52 | 1.57 |

EXAMPLE III

When 5 parts of sodium and 2.5 parts of potassium oxide are added to the reactor of Example I along with 100 ml. of mineral oil, the reactor then pressurized at 180° C. with 1000 p.s.i. of propylene and these conditions maintained for a period of 5 hours with agitation, a good conversion to $C_6$ olefins is obtained, the major proportion of which comprises 4-methylpentene-1.

In contrast to the unique results obtained in the above illustrative examples, when potassium is employed alone, lower conversions are obtained with a lower proportion of 4-methylpentene-1 in the product and a pronounced reduction in the catalyst effectiveness is obtained. Likewise, when sodium is employed alone as the catalyst, little or no 4-methylpentene-1 is produced as a part of the $C_6$ product.

The following examples will illustrate additional embodiments of the invention.

EXAMPLE IV

The procedure of Example II is repeated essentially as described with exception that in place of propylene, pentene-1 is employed as the starting olefin and in place of potassium oxide, barium oxide is employed. Employing this procedure, a $C_{10}$ olefin mixture is obtained.

EXAMPLE V

When Example II is repeated substituting cesium and rubidium metal for potassium metal, equally good results are obtained.

The above examples have been presented by way of illustration and it is not intended to be limited thereto. It will now be evident that other alkali metals in combination with the designated metal oxides and olefins can be substituted.

As indicated in the above discussion, the process can be conducted under a variety of conditions. Generally, the temperature which is employed is between about 100 to 250° C. Lower temperatures are employable, however, the rate and conversion are correspondingly reduced. Higher temperatures are to be avoided since some degradation will occur, catalyst life is shortened, and enhanced isomerization results. It has been found that the best results with regard to rate of reaction, yield, minimization of isomerization, and the like are obtained at temperatuers between about 150 to 200° C. and therefore this range is especially preferred. Likewise, the pressure employed is variable and in general pressures of the order of atmospheric or super-atmospheric are employed. As the pressure is increased, the rate generally is further increased. For best operation, it has been found that pressures between about 300 to 1500 p.s.i. should be employed.

The proportion of the catalyst used to the amount of olefin employed can be varied. As indicated by the above examples, as many as 10 and more cycles of pressurization of the reactor with the olefin can be affected so that thus only a minor quantity of the catalyst is necessary. Ordinarily, between about 1 to 10 percent by weight of catalyst based upon the total weight of catalyst and starting olefin is employed with best results obtained at between 2 to 5 percent by weight of the catalyst. The proportion of the alkali metal to the oxide is generally of the order of 1 to 50 percent by weight of the oxide based upon the total weight of the alkali metal and the oxide. As a practical matter, best results are obtained with regard to enhancement of reaction rate and production of the desired product when employing between 10 and 30 percent by weight of the oxide based upon the total weight of the akali metal and oxide contained in the catalyst mix.

The starting materials which are employed need not be subjected to any particular pre-treatment, such as further purification, and the like. For example, the starting olefin, alkali metal, and alkali metal oxide are generally employed in their form as commercially available. The olefin can thus have other essentially inert constituents present therein, such as saturated hydrocarbons and the like. It is preferable that both the olefin and the metal oxide be essentially anhydrous in order to avoid unnecessary reactivity with the alkali metal. However, the normal amount of moisture contained in commercial grades of the olefin and solid metal oxides is not deleterious to the effects and results of the present invention.

As indicated by the above examples, generally the process is conducted in the presence of a solvent. While solvents are not required, they do facilitate heat control, contact of the reactants, and additionally provide a means for having the olefin in solution for greater reactivity. For these purposes, the usual essentially inert organic solvents can be employed. The hydrocarbons have been found to be particularly effective. Among the criteria of choice of the solvents is that they be essentially inert and liquid under the reaction conditions employed. Likewise, it is desirable that they exhibit solubility for the olefin starting reagent. Thus, typical examples of solvents to be employed are the saturated aliphatic hydrocarbons, e.g., hexane, octane, nonane, decane, isooctane, decalin, cycloheptane, and mixtures as, for example, kerosene, mineral oil, and the like. It is preferable that the solvent employed be higher boiling, that is, that it have a boiling point at least about 20° C. higher than the boiling point of the olefin product. It is preferred that the solvent have a boiling point or a boiling point range above about 200° C. for ease of handling and separation from the reaction mixture. Mineral oil, such as Nujol and Bayol-D, comprises an especially preferred solvent.

As illustrated by Example II, rather than pre-form the oxide, such can be obtained in situ in the reaction system. Generally, this is accomplished by oxidizing a portion of the alkali metal merely by exposing it to an atmosphere containing oxygen, e.g., oxygen itself or air, but in a controlled fashion to result in the requisite amount of oxide in combination with the alkali metal. This operation is preferably conducted in the presence of an inert atmosphere to avoid inflammation and possible explosions. The amount of oxygen brought into contact with the alkali metal is generally an amount sufficient to obtain a mixture of the alkali metal and its oxides preferably containing about 10 to 30 percent by weight of the latter.

The olefin mixture produced according to the process of the instant invention can be employed for various uses as obtained directly from the reaction mixture, such as flashing from the reactor, continuous withdrawal and the like. If it is desired to separate the mixture into its components to obtain more pure material, such can be accomplished by conventional techniques such as, for example, fractional distillation, azeotropic distillation, and extractive distillation. By such techniques, for example, from propylene dimerization, 4-methylpentene-1 can be obtained in greater purity for more effective use in polymerization and the other isomers having other uses, for example 2-methyl-2-pentene can be isolated for cracking to isoprene by known techniques.

The products produced according to the process of the present invention are of considerable utility. By way of example, the longer chain olefins can be employed as solvents for various organic compounds. They can also be employed as components for fuel mixtures, especially fuels of the gasoline boiling range for internal combustion engines. For example, when adding 4-methylpentene-1 to a typical motor fuel, an enhancement in the octane number is obtained. Another use for the olefin products obtained is for polymerization to produce polymeric materials. A particularly effective illustration of the utility is the polymerization of 4-methylpentene-1 in the presence of a catalyst comprising an organometallic, such as triethylaluminum or diethyl aluminum chloride in combination with a refractory metal halide, such as vanadium tetrachloride, at temperatures of about 100 to 200° C. and elevated pressure to produce poly-4-methylpentene-1. This particular utility is illustrated in British Patents 808,144 and 849,553. These polymers are quite useful in forming fibers as illustrated by U.S. Patent 2,842,532, British Patent 823,309, and British Patent 835,759. Other uses for the products produced according to the instant process will now be evident.

Having thus described the novel process of this invention, it is not intended that it be limited except as set forth in the following claims.

I claim:

1. A process for dimerizing a straight chain olefin characterized by having one double bond and from 3 up to about 8 carbon atoms which comprises heating said olefin in contact with a catalyst consisting essentially of an alkali metal and an oxide of a metal selected from the group consisting of alkali metals having an atomic number of 19 to 55, inclusive, and barium, said oxide being present in an amount between about 1 to 50 percent by weight based on the total weight of the catalyst mixture.

2. The process of claim 1 wherein said olefin is propylene.

3. The process of claim 1 wherein the reaction is conducted at a temperature between about 150 to 200° C.

4. The process of claim 3 further characterized in that the catalyst comprises potassium metal in admixture with an oxide of potassium, said oxide of potassium being present in the mix in amount between about 10 to 30 percent by weight.

5. The proces of claim 3 further characterized in that the catalyst comprises sodium metal in admixture with an oxide of potassium, said potassium oxide being present in the mix in amount between about 10 to 30 percent by weight.

6. The process of claim 3 wherein the reaction is conducted in the presence of a liquid, saturated, aliphatic hydrocarbon.

7. The process for the manufacture of 4-methylpentene-1 which comprises contacting propylene with a catalyst mixture consisting essentially of potassium and an oxide of potassium at a temperature between about 150 to 200° C. and a pressure between about 300 to 1500 p.s.i., said oxide of potassium being present in amount between about 10 to 30 percent by weight based upon the total weight of said catalyst mixture.

References Cited by the Examiner
UNITED STATES PATENTS

| | | | |
|---|---|---|---|
| 2,202,270 | 5/40 | Scott | 23—184 |
| 2,466,694 | 4/49 | Freed | 260—683.15 |
| 2,881,234 | 4/59 | Esmay et al. | 260—683.15 |
| 2,986,588 | 5/61 | Schramm | 260—683.15 |
| 3,095,461 | 6/63 | Wilkes | 260—683.15 |

ALPHONSO D. SULLIVAN, *Primary Examiner.*

PAUL M. COUGHLAN, *Examiner.*